Dec. 22, 1959    R. T. A. HOWELL ET AL    2,918,572
VARIABLE IMPEDANCE MICROWAVE APPARATUS
Filed May 8, 1956    3 Sheets-Sheet 1
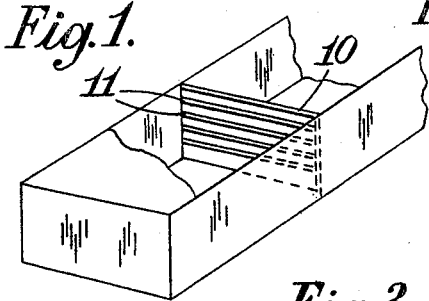
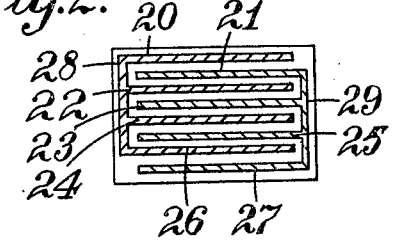
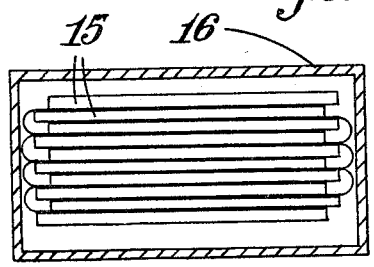
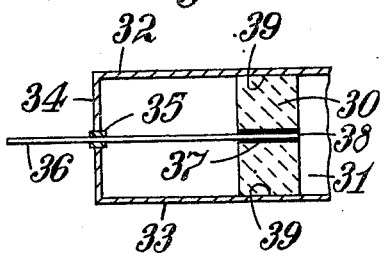
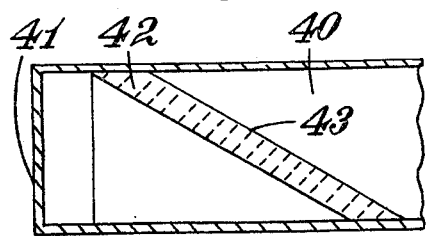
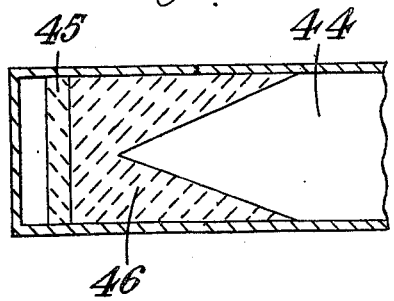
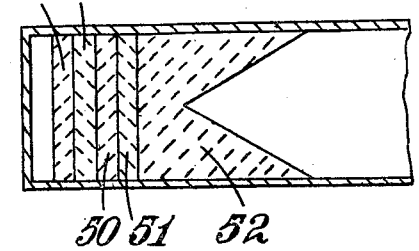

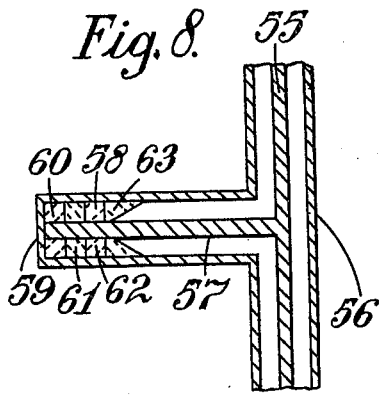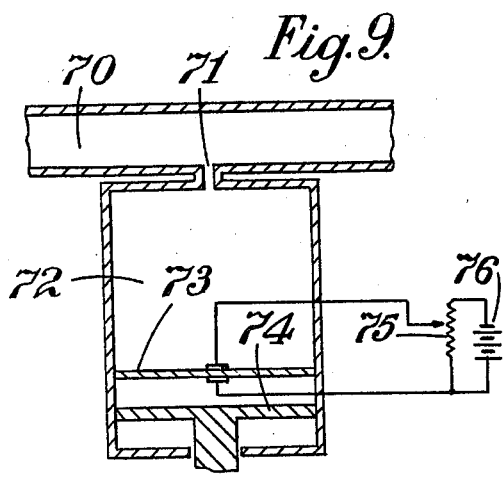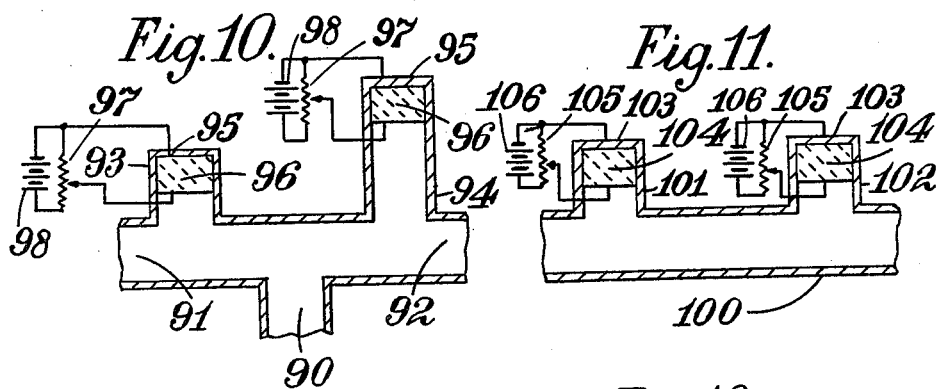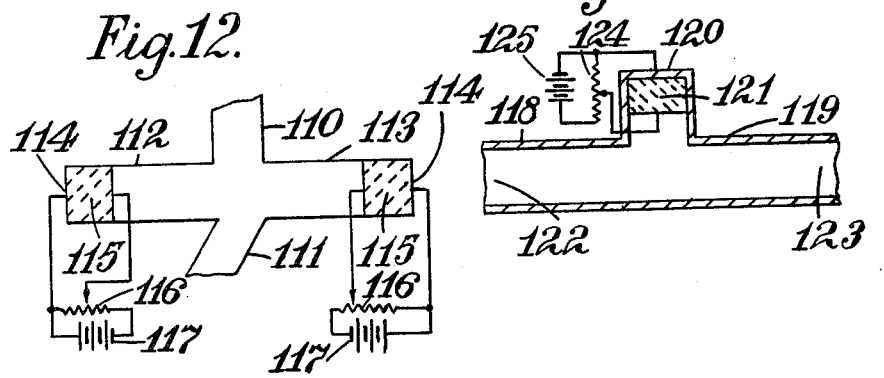

United States Patent Office 2,918,572
Patented Dec. 22, 1959

2,918,572

VARIABLE IMPEDANCE MICROWAVE APPARATUS

Ronald Thomas Albert Howell and Leo Young, London, England; said Howell and said Young assignors to The Decca Record Company Limited, London, England, a British company Application May 8, 1956, Serial No. 583,482

7 Claims. (Cl. 250—13)

This invention relates to microwave apparatus and in particular to apparatus which includes a waveguide or other surface wave transmission system or a cavity or other bounded portion containing an electric microwave frequency field and has for one of its objects to provide improved means for adjusting the effective electrical dimensions of such a transmission system, cavity or other bounded portion.

The invention makes use of the property that the dielectric constant of certain dielectric materials, notably the high dielectric constant ceramic materials containing as their principal constituent barium titanate or certain other titanates and containing also certain metallic oxides (to reduce the loss angle at micro-wave frequencies), can be controlled by an applied electric potential gradient established within the material. For convenience such materials will be described hereinafter as dielectric materials of the kind referred to. The dielectric constant of such material depends only on the potential gradient established in the material and is not affected by the direction of that gradient.

According to this invention, a tunable cavity or line comprises a resonant cavity or length of line containing dielectric material of the kind referred to extending across the cavity or line, matching means in the cavity or line on one side of the dielectric material for matching the impedance of the part containing the dielectric material to the part without the material, and means for applying a variable electric control potential to said material. The applied potential controls the dielectric constant of the dielectric material and hence controls the effective electrical dimensions of the cavity or line. By this arrangement, therefore, a cavity or line can be tuned merely by adjustment of an electric potential without the necessity of having any mechanically movable parts in the cavity or line.

In the case of a simple control potential from an external source applied to the material, the direction, as distinct from the magnitude, in which the potential is applied does not directly affect the dielectric constant and hence is immaterial so far as microwave frequency field is concerned. However, if the microwave frequency field is strong, it will itself produce a potential gradient in the material and, in this case, the direction of the external potential with respect to the microwave frequency field may have to be taken into consideration.

The invention is applicable, for example, to microwave phase shifters, short-circuit plungers, power dividers, matching sections and switching systems. Heretofore in such apparatus it has generally been necessary to use mechanically movable parts. The present invention makes it possible to control by an external electric field, the electrical dimensions of a part of the system and by this means it is possible to control, for example, the phase angle, attenuation, mode distribution or impedance of the system. Such control can be effected rapidly and, if desired, continuously varied in a cyclic manner. It will be appreciated that the elimination of moving parts greatly facilitates the construction of rigid and compact systems.

It will in general be necessary to provide matching means for matching the impedance of the part of the apparatus containing the dielectric material to the incident radio frequency field. Many forms of matching devices for use in microwave apparatus are known and suitable constructions to meet any particular requirement will generally be readily apparent. In a tunable cavity or line such as has been described above, the matching means may, for example, comprise one or more pieces of material having a dielectric constant of a value or values intermediate between the constants of the regions to be matched. Materials of such dielectric constants may readily be made by powdering the dielectric material of the kind referred to above and mixing it in polyfoam or other suitable diluting plastic material. Only one piece of material with an intermediate dielectric constant might be used but in general better matching will be obtained by employing a graded series of elements arranged in order of their dielectric constants which would be suitably chosen in accordance with the dimensions of the elements.

As is also known, matching in a tunable cavity or line may be effected by shaping dielectric material to have a section which varies along the length of the cavity or line. For example, matching elements may be formed by shaping material in the form of a wedge or inverse wedge for a rectangular cavity or waveguide or in the form of a cone or inverse cone for a cavity or line of circular section. The material to which the electric potential is applied may be shaped in this manner. As previously explained the dielectric constant depends on the potential gradient and thus the constant will only be variable in the region where the applied variable gradient exists and hence the matching means can be formed integrally with the material to which the potential is applied without affecting the performance of the latter. Alternatively, a separate piece of dielectric material, either high constant material of the kind referred to or of lower constant, may be suitably shaped to form a matching device and, if desired, this may be combined with a series of elements having intermediate dielectric constants.

As indicated above, the direction of the applied controlling field is immaterial if it is much stronger than the incident microwave field. It is, however, necessary to have quite a high potential gradient for most purposes, for example a gradient of two kilovolts per millimetre may be required. The potential will generally be applied to the material between two electrodes and in order to minimize the potential required, the electrodes must be close together. This is normally the major factor in determining the position of the electrodes on the material. Because of the very high dielectric constant of the material, there would be a very large potential drop between an electrode and the material if the electrode were not in intimate contact with the material. To obtain the required close contact, the electrode may be formed of conducting material such as a metal, for example silver, platinum, etc., which is fired onto the dielectric. Conductive material alternatively may be painted on to the surface by applying the material in a suitable medium, for example colloidal graphite in a carrying medium. Silver may be deposited on the surface by a chemical deposition process in which the silver is deposited by the result of chemical action between two compounds which are sprayed on to the surface successively. Some metals such as copper or silver can be sprayed on directly.

One convenient way of arranging the two electrodes is to have such conducting surfaces on opposite sides of a thin sheet of the dielectric material. It will be apparent, however, that it will not generally be possible to put dielectric material having conducting surfaces in a waveguide or other transmission system with these surfaces extending substantially wholly across the incident field since the conducting surfaces would then form short-circuits. To overcome this difficulty, the conducting surfaces on the dielectric material may be made in the form of a strip or a series of strips, which strip or strips are arranged at right angles to the electric vector of the incident field. Thus, for example, in a rectangular waveguide each electrode might comprise a series of parallel strips arranged parallel to the broad face of the guide. The two electrodes may be arranged on one face of the dielectric material by using alternate strips of conducting material for each electrode.

Another manner of applying the potential to the dielectric material is by using ionized gas as a conducting medium. In this case, each electrode would be constituted of ionized gas against a face of the dielectric material and the ionization would have to be such that there is effective conduction for the high applied potential. There must, however, be insufficient conductivity to form a short-circuit for the incident field if the ionized gas lies in the path of this field. The ionized gas may be sealed in a chamber adjacent the dielectric material in a known manner, for example in the manner used in the gas switches for T-R circuits of microwave pulse radars.

In some applications, mercury electrodes may be used in a similar manner to ionized gas.

The construction of a tunable cavity or line as described above may be used for varying the effective position of a short-circuit in a microwave system. Such a tunable cavity or line may comprise a piece of dielectric material of the kind referred to in the guide or cavity in front of a fixed short-circuit, matching means for matching the dielectric-containing portion of the waveguide or cavity to the portion containing the incident field and means for providing an adjustable control potential to said dielectric material. Such an arrangement can be used in place of a short-circuit plunger. It may be used in place of mechanical plungers, switches, attenuators or phase shifters and also it permits of new applications of such circuits because an electric controlling field may be applied much more rapidly than plungers can be moved mechanically.

As an example of the application of the adjustable short-circuit of the present invention, two such adjustable short-circuits can be used in place of movable plungers in a power divider of the kind comprising a waveguide T junction with an input arm and two output arms symmetrically arranged with respect to the input and having a stub with an adjustable short circuit in each output arm. As is well known, this arrangement can act as a power divider if the short circuits in the two stubs are moved simultaneously in the same directions in such a manner that the differences of their distances from their respective arms remains a quarter of a wavelength. This effect can be obtained using the adjustable short-circuits of the present invention by appropriate control of the potentials applied to the dielectric material. If one output arm of this power divider is connected to a dummy load, the arrangement can be used as a waveguide attenuator.

Adjustable short circuits of the kind described above may conveniently be used in a two-stub tuner (which constitutes a matching section) comprising a waveguide with two stubs spaced a quarter wavelength apart, each stub having an adjustable short-circuit. By separately adjusting the effective positions of the short-circuits in the two stubs, this tuner can be used to match a load to a source of power. With the adjustable short-circuits of the present invention the matching can readily be adjusted by variation of two control voltages applied to the dielectric material in the two stubs and no mechanically movable parts are required in the microwave portion of the system.

The two-stub tuner described in the preceding paragraph can also be used as a phase-shifter and, as such, it would be easier to match than the simpler form of phase-shifter which might be constructed by arranging in a waveguide a suitably dimensioned piece of dielectric material of the kind referred to and applying a control potential to this piece of dielectric material.

In another form of phase-shifter or matching section, a magic T or hybrid junction (e.g. rat-race or 3 db directional coupler) may be used. In this arrangement the dielectric material is put in the two symmetrical arms of the magic T on the equivalent arms of any other hybrid junction so as to form adjustable short circuits in these two arms.

Such an arrangement of the magic T or hybrid junction on the two stub tuner previously described, may also be used as switching devices for opening or blocking a waveguide circuit. A simpler form of switching device for this purpose is a single-stub tuner comprising a waveguide with a single stub, which stub contains dielectric material of the kind referred to arranged to act as an adjustable short-circuit by the application of a control voltage. With such an arrangement, in one effective position of the short circuit, the output arm is completely disconnected and all the incident energy is reflected. For another position of the short-circuit the waveguide is effectively continuous and all the incident energy is transmitted.

Since the electric controlling field can be applied and removed very rapidly, the switches described above can be used as T-R switches in pulse radar systems. In the preferred arrangement for this purpose, one of these switches is located in the radio frequency input to the receiver and is arranged to disconnect the receiver from the transmitter completely when no controlling field is applied to the dielectric. For reception, a control field is applied to the dielectric so ensuring that, in the event of any failure of the controlling field, the crystal in the receiver would be protected. For single frequency or narrow band systems, the arrangements of single stub and two-stub tuners would be adequate but, for most radar systems, a balanced arm circuit such as the magic T or hybrid junction switch would be necessary to obtain the required bandwidth.

When the switches are used in this manner in a radar system, the controlling electric field would generally be cut-off some micro-seconds before the transmitter pulse is radiated. The end of the modulator pulse may be used to reconnect the receiver to the aerial within a fraction of a micro-second of the end of the transmitter pulse. The completeness of the decoupling of the receiver would be dependent on the accuracy of the mechanical construction of the waveguide assembly and would not be dependent on the uncertain behaviour of a gas discharge. The power incident upon the dielectric duplexer may, if necessary, be reduced by a conventional pre T-R or T-R cell, but the positive action of the dielectric duplexer ensures crystal protection.

The following is a description of a number of embodiments of the invention reference being made to the accompanying drawings in which:

Figure 1 is a perspective view of a waveguide with part of one face cut away to show the interior construction;

Figure 2 is a view of one face of a rectangular sheet of dielectric material showing the arrangement of two electrodes on the surface thereof;

Figure 3 is a transverse section of a waveguide;

Figure 4 is a longitudinal section through part of a short-circuited waveguide;

Figures 5, 6 and 7 are also longitudinal sections through short-circuited waveguides showing various matching arrangements;

Figure 8 is a sectional view of a short-circuited stub on a coaxial line;

Figure 9 is a longitudinal section through a waveguide having a resonant cavity coupled thereto;

Figure 10 is a sectional view of a power divider;

Figure 11 is a sectional view of a two-stub tuner;

Figure 12 is a diagrammatic view of a magic T;

Figure 13 is a sectional view of a waveguide with a short-circuited stub; and

Figure 14:
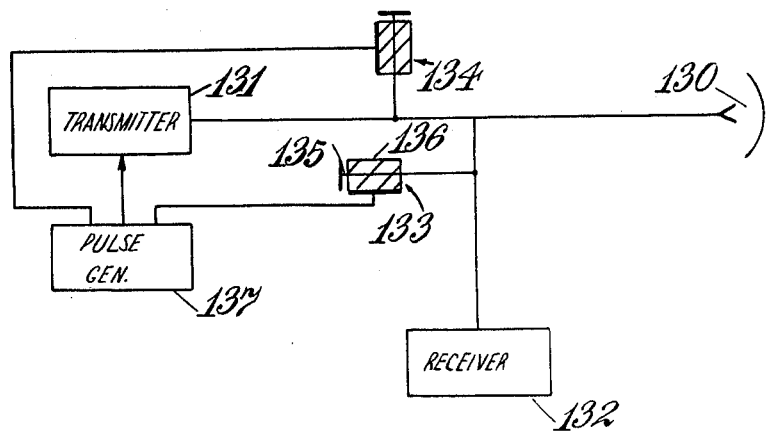
Figures 14 and 15 are diagrams of duplexers for radar apparatus.

As indicated above, the method of applying the control potential to the dielectric material will depend to a large extent on the nature of the apparatus in which the material is to be employed. If the material is to be arranged as a thing sheet extending across a rectangular waveguide as shown in Figure 1, which is a perspective view of a waveguide with part of the broad face cut away to show the interior, a sheet 10 of the dielectric material may be provided with a series of strips 11 of silver or other suitable metal fired onto the surface of the dielectric. Two sets of such strips may be provided, one on each of the two opposite faces of the dielectrical material, and the electric control potential may be applied to these strips by leads (not shown) passing through suitable bushings in the waveguide wall. By arranging the electrode on opposite sides of the dielectric material, this material prevents any possibility of sparking or breakdown between the electrodes due to ionization of the surrounding air or other gas.

In some circumstances, however, it will be preferable to have both electrodes on one face of the dielectric material and in this case they may be arranged as shown in Figure 2 in which the conducting material (shown with hatching for clarity) is arranged as a series of parallel strips 20—27 with alternate strips, such as strips 20, 22, 24 and 26, connected together on one side as indicated at 28 to form one electrode and the remaining strips 21, 23, 25 and 27 connected together at the other side as indicated at 29 to form the second electrode.

In both Figures 1 and 2 the strips are illustrated as being parallel to the broad face of the waveguide. It will be appreciated that they must be arranged at right angles to the electric vector of the field in the waveguide in order to prevent them presenting a short-circuit to the incident field. Bearing this consideration in mind the form of strips for use in other applications would be readily apparent.

Another electrode construction for a rectangular waveguide is illustrated in Figure 3 which shows a transverse section of a waveguide with a sandwich arrangement of slabs 15 of the dielectric material lying parallel to the broad face 16 of the guide so as to have their sandwich surfaces perpendicular to the electric vector. These surfaces are made conductive by suitable material on both sides of each slab as shown by the heavy lines in the figure. The slabs 15 are staggered slightly and a small strip is left non-conductive at one end of each face of the material, these non-conductive portions being on opposite sides on opposite faces so that on each side of the guide, only one conductive layer on alternate strips is exposed. The connections to alternate conductive layers of the sandwich are made at either side of the waveguide and this staggered arrangement facilitates the making of connections. Such an arrangement enables a relatively low applied potential to be employed since the layers of dielectric material can readily be made very thin. The inter-connections between the conductive layers are made at the sides of the guide where the electric field is small and hence the interconnecting links will not short-circuit the guide.

In order to avoid sparking or breakdowns between the electrodes and the walls of the wave guide, it is preferable in an arrangement such as is shown in Figure 1 to apply potentials to the two electrodes which are equal and opposite with respect to the potential of the waveguide, which would normally be earthed.

Figure 4 shows another method of applying a potential to the dielectric material which is particularly convenient when the latter is arranged close to the end of a short-circuited waveguide. In this figure the dielectric material 30 extends across the waveguide 31 between the faces 32, 33, this waveguide being terminated by a short-circuiting termination 34. An insulating bushing 35 is provided in the centre of the termination 34 and through this bushing extends a lead 36 to which the required high voltage is applied. This lead 36 is soldered or otherwise secured in electrical contact with a metallic coating 37 formed in a central bore 38 through the block of dielectric material. The outer edge of the dielectric material 30 is also provided with a metallic coating 39 which is electrically connected to the waveguide walls 32, 33 so that the requisite potential gradient can be established in the material 30 by applying a suitable potential between the lead 36 and the waveguide structure. The arrangement of Figure 4 is particularly suitable for circular waveguides since it avoids any radially extending conducting material, which would act as a short-circuit to a field having a radial electric vector.

Another method of applying the potential to the dielectric material is by arranging chambers of ionized gas on either side of the dielectric material with conducting electrodes extending respectively into the two chambers. These electrodes are connected to the source of control potential which is thus applied to the dielectric material through the ionized gas in the chambers. If these chambers are arranged within the length of a waveguide, then their ionization must be carefully controlled so as to ensure that it is sufficient to enable the control potential to be applied to the dielectric material but is not so great as to act as a short-circuit for the incident radio frequency field.

Yet another method of applying the potential to the dielectric field is by means of mercury electrodes, that is to say, with pools of mercury forming the contacts to the dielectric material.

It will be readily apparent from the foregoing that there are many possible constructions by which a control potential may be applied to the dielectric material in microwave apparatus and, in the light of the foregoing, suitable methods will be readily apparent for any of the forms of apparatus hereinafter described.

The dielectric material of the kind referred to has a very high dielectric constant which may be of the order of many thousands, and if this material is put across a waveguide there will almost invariably be a serious mismatch unless steps are taken to match the impedance of the part of the guide containing the dielectric to the remainder of the guide. Such matching may be effected by using known matching techniques such as, for example, the arrangement shown in Figure 5 which shows a length of waveguide 40 terminated in a short-circuit 41 and having a slab of dielectric material 42 of the kind referred to extending across the guide at a point near the short-circuit, the slab sloping in the lengthwise direction of the guide. The face of the dielectric material directed towards the incident radio frequency energy has, in this manner, a sloping surface 43 so that the impedance of the guide gradually changes. In Figure 6 there is shown another construction of short-circuited rectangular waveguide 44 containing a sheet of dielectric material 45, this material being the material of the kind referred to and having a very high dielectric constant. In front of this material there is arranged a matching element formed of material having a dielectric constant which is intermediate between that of the element 45 and that of the unfilled portion of the waveguide 44. This material is shaped as an inverse wedge so as to provide the required gradual change of the impedance along the guide in the direction towards the material 45. As shown in Figure 7, which also shows a short-circuited rectangular waveguide, a sheet 48 of dielectric material of the kind referred to may be arranged across the guide with a series of elements of material having lower dielectric constants ararnged in front of it as, for example, the elements 49, 50 and 51. An inverse wedge 52 is provided as the final element of the matching system. In an arrangement such as Figure 7, the dielectric constants of the various elements would be chosen in accordance with the thickness of the various elements and they would be arranged in ascending order towards the element 48. The wedge 52 might be made, for example, of the material known under the registered trademark "Distrene." The remaining elements would have to have substantially higher dielectric constants and they may conveniently be made by powdering dielectric material of the kind referred to and mixing the powder in a thermoplastic such as "Polyfoam." Such a process enables material of any desired dielectric constant intermediate between that of the material 48 and that of the basic thermoplatsic material to be readily produced. In the case of circular waveguides, cones or inverse cones would be used for matching instead of wedges or inverse wedges.

Figure 8 illustrates a coaxial line comprising an inner conductor 55 and an outer conductor 56 with a stub formed by an inner conductor 57 and an outer conductor 58, this stub being terminated by a short-circuit 59. An element 60 of dielectric material of the kind referred to is positioned immediately adjacent the short-circuit 59 and this element can be matched in a similar way to that used for wave guides by employing elements 61, 62 having dielectric constants of intermediate value and an inverse conical terminating element 63.

From the foregoing it will be seen that matching may be effected by using known principles. It will be clear that these principles may readily be applied to cases where the dielectric material is used in apparatus other than waveguides or transmission lines and in the following description of specific examples of the invention, for the sake of clarity, reference to the various possible types of matching devices for each individual application of the invention will be omitted.

As an example of one application of the invention there is illustrated in Figure 9 a waveguide 70 coupled through an aperture 71 to a tuning cavity 72 of a wavemeter. Across the tuning cavity there is arranged a sheet 73 of dielectric material of the kind referred to and means (not shown) are provided for applying an adjustable control potential to this material. Such a control potential is illustrated diagrammatically as being derived from a potentiometer 75 connected across a battery 76. Beyond the sheet 73 is arranged an adjustable short-circuit plunger 74. The cavity 72 may be tuned by varying the potential applied to the sheet 73 thereby altering the effective distance between the opening 71 and the plunger 74. This dielectric material provides a convenient method of fine control of the tuning of the cavity and the plunger 74 is made movable to provide a coarse control.

Figure 10 illustrates a power divider for dividing power in a waveguide 90 between two outlet guides 91, 92. Two stubs 93, 94 are provided on either side of the junction between the guides 90, 91 and 92, these stubs being positioned one quarter of a guide wavelength along the guides 91, 92 from the junction point. The two stubs differ in length by a quarter of a guide wavelength and they are each terminated by a short-circuit 95 and have, immediately in front of the short-circuit, a block 96 of dielectric material of the kind referred to. This block is of sufficient size that, by applying a control potential, the effective length of the stub can be changed by a quarter of a wavelength. The control potentials are illustrated diagrammatically as being derived from potentiometers 97 connected across batteries 98. The power divider thus operates in a similar manner to the known type of divider using movable plungers to enable the power to be divided in any desired ratio between the guides 91 and 92. By connecting one of the guides 91, 92 to a dummy load this arrangement may be used as a waveguide attenuator.

Figure 11 illustrates a two-stub tuner for a waveguide 100. The two stubs 101, 102 are spaced a quarter of a guide wavelength apart and each is terminated by a short-circuit 103 behind a block 104 of dielectric material of the kind referred to. By separately adjusting control potentials applied to the two blocks 104, the effective length of the two stubs can be adjusted and thus the arrangement can be used as a matching section to match a generator to a load. Such control potentials are illustrated diagrammatically as being derived from potentiometers 105 connected across batteries 106.

As shown in Figure 12, dielectric material of the kind referred to may be used in a magic T which is illustrated diagrammatically in the Figure with E and H arms 110 and 111 respectively and two symmetrical arms 112, 113. The two arms 112, 113 are each provided with a short-circuit 114 and a block 115 of the dielectric material of the kind referred to. Means, illustrated diagrammatically by potentiometers 116 connected across batteries 117, are provided for applying variable control potentials to the blocks 115 so as to vary the effective position of the short-circuits in the two arms 112, 113. If the effective short-circuits in the arms 112, 113 are equi-distant from the junction point of the magic T then the E and H arms are isolated from one another but if the effective short-circuits are at distances from the junction point differing by a quarter of a guide wavelength, then the E and H arms are coupled to one another. The arrangement, therefore, may be used as a switch. By making the two control potentials continuously variable over a range the magic T may be used as a phase shifter or matching system. It will be clear that similar results may be obtained with other hybrid junctions such as a rat-race or a 3 db directional coupler.

Figure 13 shows a waveguide 118 with a single stub 119 terminated in a short-circuit 120 and having a block 121 of dielectric material of the kind referred to arranged in front of the short-circuit. By varying a control potential applied to the dielectric material 121, the effective position of the short-circuit can be varied. The control potential is illustrated diagrammatically as being derived from a potentiometer 124 connected across a battery 125. By suitable choice of dimensions of the material and applied potential, all the energy incident in the input end 122 of the waveguide 118 is reflected and hence there is no signal transmitted to the outlet portion 123. For another effective position of the short-circuit, all the incident energy is transmitted from the portion 122 to the portion 123 of the waveguide hence this arrangement may also be used as a switch.

The above described switches may conveniently be used as duplexer junctions in radar apparatus for connecting a common aerial alternatively to a transmitter or receiver since the electric controlling field can be applied very rapidly. Preferably one of the switches is arranged in circuit in front of the receiver, the arrangement being such that the receiver is completely dis-engaged from the transmitter when no control potential is applied to the dielectric material. This would ensure that in the event of any failure of the control potential, the receiver would be protected. For reception the control potential would be applied to the dielectric material and for this purpose a pulse generating circuit generating a suitable rectangular pulse wave form may be used. For a narrow band system, a switch such as is shown in Figure 13 may be used but for most radar systems a balanced arm circuit such as is shown in Figure 12 would be preferred in order to obtain the required band width. When used in this manner in a radar system, the controlling electric field would be cut-off a few micro-seconds before the transmitter pulse is radiated. There is no difficulty in timing such switching pulses very accurately. The completeness of the de-coupling of the receiver from the transmitter is a function of the accuracy of the mechanical construction of the waveguide assembly and it is not dependent on the uncertain behaviour of a gas discharge as in conventional types of T—R switches using gas switches. The end of the modulator pulse, which modulates the transmitter, may be used to reconnect the receiver within a fraction of a microsecond of the end of the transmitter pulse. Such switches as have been described above may be used in conjunction with conventional types of pre-T—R or T—R cells which would then serve to reduce the power incident on the dielectric switch and in this case the dielectric switch would ensure protection of the crystal in the receiver in the event of any failure of the pre-T—R or T—R cell.

Figure 15:
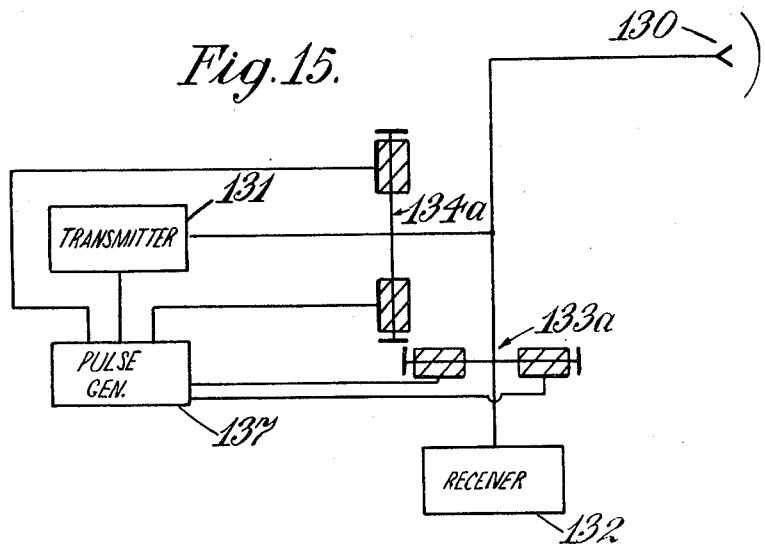

Figures 14 and 15 illustrate two forms of such radar duplexers. In Figure 14 an aerial 130 is connected alternatively to a microwave pulse transmitter 131 or a receiver 132 by means of a duplexer consisting of two stub switches 133, 134 which are similar to the switch shown in Figure 13. The switch 133 comprises a short-circuited stub 135 arranged in a waveguide circuit in front of the receiver 132 and containing dielectric material 136 to which a control potential of rectangular waveform is applied from a pulse generator 137. The switch 134, which constitutes a pre-T—R switch, is arranged in front of the transmitter 131 and formed by a short-circuited stub 138 containing dielectric material 139 to which a control potential of rectangular waveform is applied from the pulse generator 137. The two switches 133, 134 are arranged so that the receiver is normally blocked from receiving signals directly from the transmitter but is opened to receive signals from the aerial by the application of the control potential to the dielectric material 136. The arrangement of Figure 15 is similar to that of Figure 14 and similar reference numerals are used to indicate similar components. In Figure 15, the T—R and pre-T—R switches 133a and 134a, however are constituted by hybrid units of the kind described with reference to Figure 12, this arrangement permitting a wider bandwith to be obtained than the single stub switches used in the duplexer of Figure 14.

We claim:

1. A hybrid junction in combination with terminations for the two symmetrical arms of the junction, which terminations each comprise a length of waveguide terminated in a fixed short-circuit and having, in the guide in front of the fixed short-circuit, a piece of dielectric material of the kind in which the dielectric constant may be varied by an applied electric field, matching means for matching the dielectric-containing portion of the waveguide to the unterminated part thereof, and means for applying an adjustable control potential to said dielectric material.

2. In microwave pulse radar apparatus having a pulse transmitter, a receiver, and an antenna; a duplexer for connecting the antenna alternately to the transmitter for radiating the pulses to be transmitted and to the receiver for receiving echoes of those pulses, which duplexer comprises two switches, one arranged for opening and closing the connection between the transmitter and the antenna and the other arranged for opening and closing the connection between the receiver and the antenna, each of said switches comprising a length of waveguide connected between the antenna and the equipment connectible thereto a stub branch waveguide terminated in a fixed short-circuit said stub branch waveguide having, in front of the fixed short-circuit, a piece of dielectric material of the kind in which the dielectric constant may be varied by an applied electric potential, matching means for matching the dielectric-containing portion of the stub waveguide to the part of the stub waveguide leading to said length of waveguide between the antenna and the equipment connectible thereto, and pulse generating means for applying control pulses to the dielectric material in the two switches in synchronism to effect the required switching of the antenna connection.

3. In microwave pulse radar apparatus having a pulse transmitter, a receiver and an antenna; a duplexer for connecting the antenna alternately to the transmitter for radiating the pulses to be transmitted and to the receiver for receiving echoes of those pulses, which duplexer comprises two switches, one arranged for opening and closing the connection between the transmitter and the antenna and the other arranged for opening and closing the connection between the receiver and the antenna, each of said switches comprising a hybrid junction with four arms of which two are symmetrical arms, the third is connected to the antenna and the fourth to the equipment connectible to the antenna, said two symmetrical arms each being terminated in a fixed short-circuit with, in front of the fixed short-circuit a piece of dielectric material of the kind in which the dielectric constant may be varied by an applied electric potential, said symmetrical arms further having matching means for matching the dielectric-containing portion of the hybrid junction arm to the part thereof leading to the junction point with the other arms, and pulse generating means for applying control pulses to the dielectric material in the two switches in synchronism to effect the required switching of the antenna connection.

4. In a microwave pulse radar apparatus having a pulse transmitter, a receiver, and an antenna; a duplexer for connecting the antenna alternately to the transmitter for radiating the pulses to be transmitted and to the receiver for receiving echoes of those pulses, which duplexer comprises two switches, one arranged for opening and closing the connection between the transmitter and the antenna and the other arranged for opening and closing the connection between the receiver and the antenna, each of said switches comprising a length of waveguide connected between the antenna and the equipment connectible thereto a stub branch waveguide terminated in a fixed short-circuit said stub branch waveguide having, in front of the fixed short-circuit, a piece of dielectric material of the kind in which the dielectric constant may be varied by an applied electric potential, and pulse generating means for applying control pulses to the dielectric material in the two switches in synchronism to effect the required switching of the antenna connection.

5. In microwave pulse radar apparatus having a pulse transmitter, a receiver and an antenna; a duplexer for connecting the antenna alternately to the transmitter for radiating the pulses to be transmitted and to the receiver for receiving echoes of those pulses, which duplexer comprises two switches, one arranged for opening and closing the connection between the transmitter and the antenna and the other arranged for opening and closing the connection between the receiver and the antenna, each of said switches comprising a hybrid junction with four arms of which two are symmetrical arms, the third is connected to the antenna and the fourth to the equipment connectible to the antenna, said two symmetrical arms each being terminated in a fixed short-circuit with, in front of the fixed short-circuit a piece of dielectric material of the kind in which the dielectric constant may be varied by an applied electric potential, and pulse generating means for applying control pulses to the dielectric material in the two switches in synchronism to effect the required switching of the antenna connection.

6. In microwave pulse radar apparatus having a pulse transmitter, a receiver, and an antenna; a duplexer for connecting the antenna alternately to the transmitter for radiating the pulses to be transmitted and to the receiver for receiving echoes of those pulses, which duplexer comprises a length of waveguide connected between the antenna and the receiver, a stub branch waveguide terminated in a fixed short-circuit, said stub branch waveguide having, in front of the fixed short-circuit, a piece of dielectric material of the kind in which the dielectric constant may be varied by an applied electric potential, and pulse generating means for applying control pulses to the dielectric material to effect the required switching of the antenna connection to the receiver.

7. A duplexer as claimed in claim 6 wherein said switch comprises a hybrid junction with four arms of which two are symmetrical arms, the third is connected to the antenna and the fourth to the receiver, both said symmetrical arms forming stubs and being terminated in fixed short-circuits and having, in front of the short-circuits, pieces of dielectric material of the kind in which the dielectric constant may be varied by an applied electric potential and wherein said pulse generating means is arranged to apply control pulses to both said pieces of dielectric material in synchronism.

References Cited in the file of this patent

UNITED STATES PATENTS

| | | |
|---|---|---|
| 2,532,157 | Evans | Nov. 28, 1950 |
| 2,607,031 | Denis et al. | Aug. 12, 1952 |
| 2,681,987 | Farr | June 22, 1954 |
| 2,701,861 | Andrews | Feb. 8, 1955 |
| 2,704,348 | Carlin | Mar. 15, 1955 |
| 2,707,231 | Townes | Apr. 26, 1955 |
| 2,801,389 | Linder | July 30, 1957 |
| 2,830,289 | Zaleski | Apr. 8, 1958 |

FOREIGN PATENTS

| | | |
|---|---|---|
| 674,874 | Great Britain | July 2, 1952 |